(12) United States Patent
Abrahamsson et al.

(10) Patent No.: US 11,959,523 B2
(45) Date of Patent: Apr. 16, 2024

(54) BRAKE ASSEMBLY WITH WEAR INDICATOR ASSEMBLY

(71) Applicant: Volvo Construction Equipment AB, Eskilstuna (SE)

(72) Inventors: Johan Abrahamsson, Strängnäs (SE); Arto Honkanen, Eskilstuna (SE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 24 days.

(21) Appl. No.: 17/052,505

(22) PCT Filed: May 4, 2018

(86) PCT No.: PCT/EP2018/061534
§ 371 (c)(1),
(2) Date: Nov. 2, 2020

(87) PCT Pub. No.: WO2019/210971
PCT Pub. Date: Nov. 7, 2019

(65) Prior Publication Data
US 2021/0246956 A1    Aug. 12, 2021

(51) Int. Cl.
*F16D 66/02* (2006.01)
*F16D 55/36* (2006.01)

(52) U.S. Cl.
CPC .............. *F16D 66/02* (2013.01); *F16D 55/36* (2013.01)

(58) Field of Classification Search
CPC .............. F16D 66/02; F16D 2066/003; F16D 65/0043; F16D 65/028; F16D 66/00; F16D 55/36; B60T 17/22; B60T 17/221
(Continued)

(56) References Cited

U.S. PATENT DOCUMENTS

| 3,533,491 A | | 10/1970 | Svenson |
| 3,983,964 A | * | 10/1976 | Beals ...................... F16D 66/02 |
| | | | 188/71.6 |

(Continued)

FOREIGN PATENT DOCUMENTS

| DE | 2410707 A | * | 9/1975 | ............. F16D 66/02 |
| DE | 2734786 A | * | 2/1979 | ............. F16D 66/02 |

(Continued)

OTHER PUBLICATIONS

Chinese First Office Action dated Oct. 25, 2021 for Chinese Patent Application No. 201880092992.1, 13 pages (including English translation).

(Continued)

*Primary Examiner* — Nicholas J Lane
*Assistant Examiner* — Stephen M Bowes
(74) *Attorney, Agent, or Firm* — Sage Patent Group

(57) ABSTRACT

The invention relates to a brake assembly, including a brake housing; a wheel rotor rotatable around a rotational axis; a friction member coupled to the wheel rotor; a first braking member and a second braking member arranged to sandwich the friction member; and a wear indicator assembly for indicating wear of the at least one friction member at an indication position on an outside of the brake housing. The wear indicator assembly includes an indicator rod having a first end inside the brake housing and a second end visible from the outside of the brake housing. The second end of the indicator rod is at a second distance from the rotational axis, greater than the first distance of the first end.

8 Claims, 3 Drawing Sheets

(58) Field of Classification Search
USPC .................................................. 188/1.11 W
See application file for complete search history.

(56) References Cited

U.S. PATENT DOCUMENTS

| | | | |
|---|---|---|---|
| 4,186,822 A | | 2/1980 | Khuntia et al. |
| 4,658,936 A | * | 4/1987 | Moseley ................. F16D 66/02 |
| | | | 188/1.11 R |
| 5,035,303 A | | 7/1991 | Sullivan |
| 5,522,259 A | * | 6/1996 | Schmidt ............... G01B 5/0028 |
| | | | 73/132 |
| 6,047,793 A | | 4/2000 | Hasegawa et al. |
| 6,076,639 A | * | 6/2000 | Dahlen ................... F16D 66/02 |
| | | | 188/1.11 R |
| 6,082,502 A | * | 7/2000 | Hawryszkow .......... F16D 66/02 |
| | | | 188/1.11 R |
| 6,237,723 B1 | | 5/2001 | Salsman |
| 8,807,290 B2 | | 8/2014 | Kubicki et al. |
| 2009/0084638 A1 | | 4/2009 | Masterson |

FOREIGN PATENT DOCUMENTS

| | | | | |
|---|---|---|---|---|
| DE | 3130237 C1 | * | 10/1982 | ............. F16D 66/02 |
| DE | 3237274 C | * | 10/1983 | ............. F16D 66/02 |
| FR | 2151881 A5 | * | 4/1973 | ............. F16D 66/02 |
| FR | 2404150 A1 | | 4/1979 | |
| FR | 3048042 A1 | | 8/2017 | |
| GB | 1529686 A | * | 10/1978 | ............. F16D 66/02 |
| GB | 2005838 A | * | 4/1979 | ............. F16D 66/02 |
| GB | 2274316 A | * | 7/1994 | ............. B60T 17/22 |
| WO | 9747896 A1 | | 12/1997 | |

OTHER PUBLICATIONS

International Search Report and Written Opinion of the International Searching Authority, PCT/EP2018/061534, dated Feb. 15, 2019, 10 pages.

European Patent Office, Office Action for EP Application No. 18724802.6, dated Oct. 27, 2022, 4 pages.

* cited by examiner

BRAKE ASSEMBLY WITH WEAR INDICATOR ASSEMBLY

CROSS REFERENCE TO RELATED APPLICATIONS

This application is a 35 U.S.C. § 371 national stage application of PCT International Application No. PCT/EP2018/061534 filed on May 4, 2018, the disclosure and content of which is incorporated by reference herein in its entirety.

TECHNICAL FIELD

The invention relates to a brake assembly for a working vehicle, and to a vehicle comprising such a brake assembly.

The invention can be applied in heavy-duty vehicles, such as trucks, buses and construction equipment. Although the invention will be described with respect to an articulated hauler, the invention is not restricted to this particular vehicle, but may also be used in other vehicles, for instance other kinds of working vehicles, such as wheel loaders or excavators etc, buses, or trucks.

BACKGROUND

A tractor or motorized excavation machinery, for example, an articulated hauler, an agricultural tractor, a loader, or an excavator, is often used off-road and thus dirt and mud, water or snow can cover the wheels and form thick coatings on the wheels covering the wheel hubs. Law and security considerations dictate that all motor vehicles and in particular heavy vehicles must have well functioning brakes. It is therefore important, despite the heavy coating of dirt on the wheel hubs, to be able to check the wear situation for each friction lining in the vehicle without having to disassemble the brakes or drive to the shop for checking.

A convenient and reliable way of measuring the wear situation is described by WO 97/47896. According to WO 97/47896, a wear indicator is provided, that comprises an indicator pin axially movable to allow one end of the indicator pin to abut against a braking member of the brake assembly, while the other end of the indicator pin can be visually observed from a position on the outside of the brake housing of the brake assembly. The wear can be assessed by measuring the change over time of the position of the other end of the indicator pin, when the brake is operated.

Although the wear indicator described by WO 97/47896 works well for many brake assembly configurations, it would be desirable to provide for more convenient indication of brake wear, in particular indication of brake wear that is suitable for new and unconventional brake assembly configurations.

SUMMARY

An object of the invention is to provide more convenient indication of brake wear, in particular indication of brake wear that is suitable for new and unconventional brake assembly configurations.

According to the invention, this object is achieved by a brake assembly for a working machine having at least one wheel, comprising: a brake housing; a wheel rotor having a first portion to be coupled to the wheel, and a second portion arranged inside the brake housing, the wheel rotor being rotatable around a rotational axis in relation to the brake housing; at least one friction member coupled to the second portion of the wheel rotor to rotate inside the brake housing when the wheel rotor rotates around the rotational axis; a first braking member and a second braking member arranged to sandwich the at least one friction member between the first braking member and the second braking member, at least the first braking member being movable in a direction parallel to the rotational axis to press the at least one friction member between the first and second braking members; and a wear indicator assembly for indicating wear of the at least one friction member at an indication position on an outside of the brake housing, wherein the wear indicator assembly comprises an indicator rod passing through the brake housing, the indicator rod having a first end inside the brake housing at a first distance from the rotational axis and a second end visible from the outside of the brake housing, wherein the indicator rod is slidable to allow the first end of the indicator rod to abut against a surface inside the brake housing at an abutting position that depends on a current thickness of the at least one friction member. The second end of the indicator rod is at a second distance from the rotational axis, greater than the first distance of the first end.

The working machine may have a working machine body and may have a plurality of wheels. Furthermore, the brake housing comprised in embodiments of the brake assembly according to the invention may be attached to the working machine body.

The first braking member may advantageously be a moving member in a so-called service brake. Alternatively, the first braking member may be a moving member in a so-called parking brake. In embodiments, furthermore, the brake assembly may comprise a third braking member arranged to axially move the first braking member. The third braking member may be actuated when parking brake is desired. The third braking member may then cause the first braking member to be axially displaced to press the friction member(s) towards the second braking member, which may be stationary.

The brake housing may be filled with a fluid, such as oil, which means that the at least one friction member may rotate in an oil filled space inside the brake housing.

The present invention is based on the realization that new developments of working machines may make it very cumbersome to measure brake wear using existing solutions. In particular, the present inventors have realized that electrification of working machines may make it very difficult or even impossible to conveniently measure brake wear using a wear indicator rod extending along a direction parallel to the rotational axis of the wheel. To deal with this issue identified by the inventors, the inventors propose to configure the wear indicator assembly such that the second (outer) end of the indicator rod is further away from the rotational axis of the wheel (and the at least one friction member) than the first (inner) end of the indicator rod. This, for example, allows for measurement of the brake wear at a location on a side surface of the brake housing, which makes measurement of the brake wear considerably less involved. For some brake assembly configurations, this may be the only possible location of the second end of the indicator rod, to avoid disassembly of the brake assembly from the working machine body. Seen from another perspective, embodiments of the present invention allow for a greater degree of freedom in the design of the brake assembly for future working machines.

According to embodiments, the wear indicator assembly may further comprise a bent tubular guide accommodating the indicator rod, and the indicator rod may be arranged to form a first angle in respect of a line parallel to the rotational axis at the first end of the indicator rod, and form a second angle in respect of a line parallel to the rotational axis at the second end of the indicator rod, the second angle being greater than the first angle. The difference in angle may advantageously be less than about 90°, and it may be easier to externally measure the brake wear if the difference in angle is approaching 90°. Accordingly, the difference may advantageously be at least 45°, and even more advantageously be at least 60°.

According to various embodiments, furthermore, the indicator rod may be a flexible rod, which may advantageously be formed by one of a spiral spring and a flat sheet metal spring. Suitable configurations of flexible rods may be found among oil gauging sticks for various vehicles, such as passenger cars.

To facilitate calibration of the wear indicator assembly, the indicator rod may advantageously comprise an adjustable end piece at the second end of the indicator rod. Such an end piece may, for example, be a cap having a greater diameter than the indicator rod, at the second end thereof, or a plug at least partly having a smaller diameter than the indicator rod, at the second end thereof. The latter solution may be particularly suitable in embodiments where the indicator rod is at least party formed by a spiral spring. The plug may then fit inside the spiral spring, and be attached to the spiral spring using, for example, interference fit or a snap joint.

In embodiments, the first end of the indicator rod may be in direct abutment with the first braking member. In other embodiments, where the braking assembly comprises the third braking member mentioned further above, the first end of the indicator rod may be in direct abutment with this third braking member.

Moreover, the brake housing may advantageously comprise a first end portion; a second end portion; and an envelope portion connecting the first end portion and the second end portion, and the indicator rod may extend through the brake housing in the envelope portion of the brake housing.

In summary, aspects of the present invention thus relate to a brake assembly, comprising a brake housing; a wheel rotor rotatable around a rotational axis; a friction member coupled to the wheel rotor; a first braking member and a second braking member arranged to sandwich the friction member; and a wear indicator assembly for indicating wear of the at least one friction member at an indication position on an outside of the brake housing. The wear indicator assembly comprises an indicator rod having a first end inside the brake housing and a second end visible from the outside of the brake housing. The second end of the indicator rod is at a second distance from the rotational axis, greater than the first distance of the first end.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
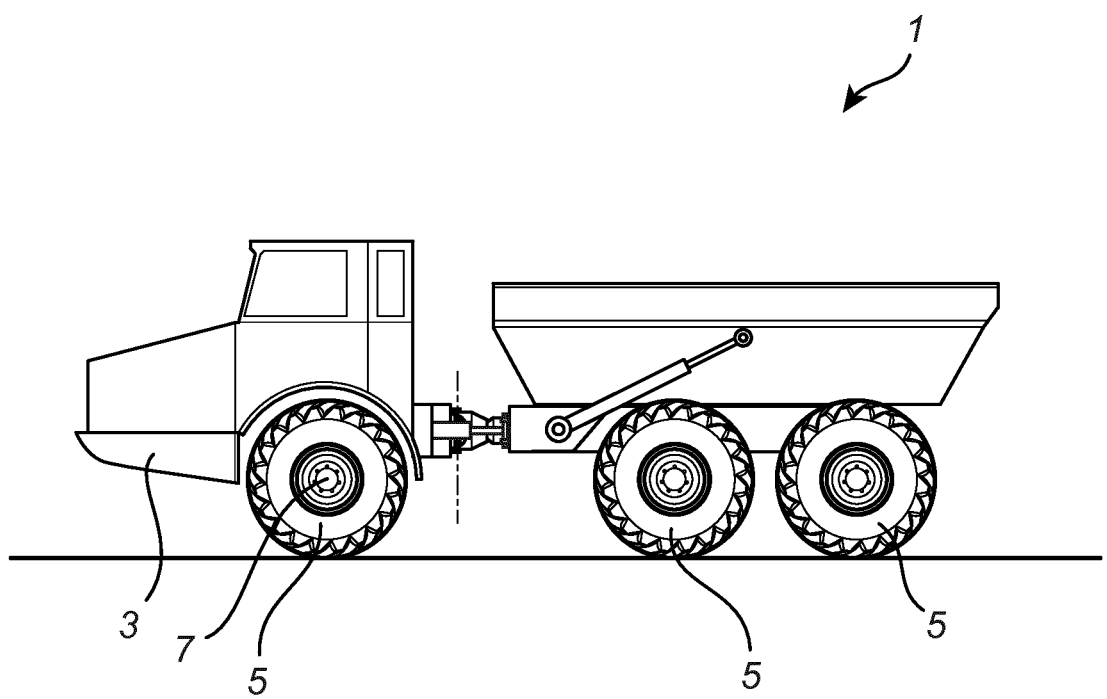
FIG. 1 is a side view of a working vehicle according to an embodiment of the present invention, in the form of an articulated hauler.

FIG. 1 schematically shows a working vehicle, here in the form of an articulated hauler 1, comprising a working vehicle body 3 and a plurality of wheels 5, each being rotatably connected to the vehicle via a brake assembly 7 according to embodiments of the present invention.

Figure 2:
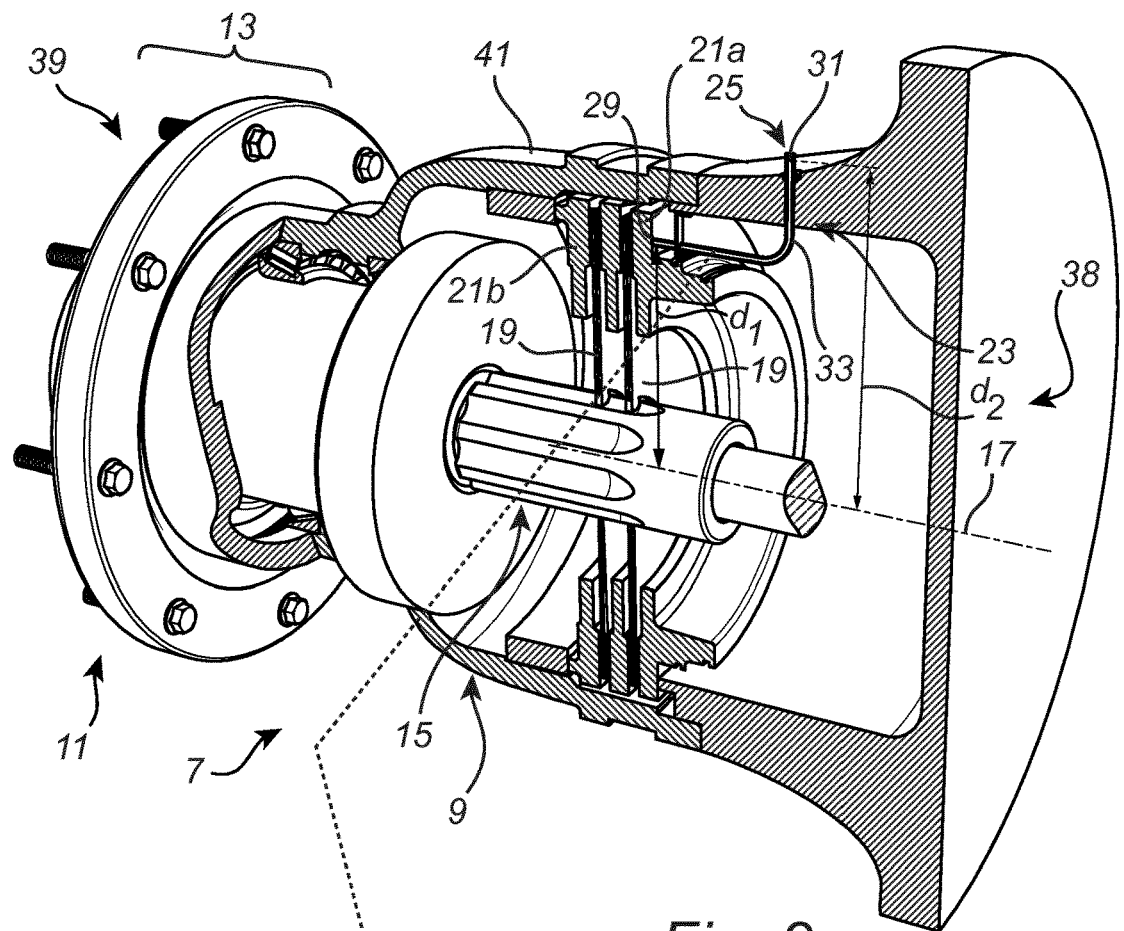
FIG. 2 is a cross-section view of a brake assembly according to an example embodiment of the present invention.

Referring to FIG. 2, the brake assembly 7 comprises a brake housing 9, a wheel rotor 11, friction members 19, a first braking member 21a, a second braking member 21b, and a wear indicator assembly 23 for indicating wear of the friction member 19. The brake housing 9 has a first end portion 38, a second end portion 39, and an envelope portion 41 connecting the first end portion 38 and the second end portion 39.

As is schematically indicated in FIG. 2, the wheel rotor 11 has a first portion 13 to be coupled to its wheel 5, and a second portion 15 arranged inside the brake housing 9. The wheel rotor 11 is rotatable around a rotational axis 17 in relation to the brake housing 9.

The friction members 19 are coupled to the second portion 15 of the wheel rotor 11, to rotate inside the brake housing 9 when the wheel rotor 11 rotates around the rotational axis 17. Suitably, the friction members 19 may be coupled to the rotational axis 17 using splines to allow axial movement of the friction members 19 in relation to the second portion 15 of the wheel rotor 11. When braking of the working vehicle 1 is desired, the first braking member 21a may be controlled to move axially towards the second braking member 21b. At least the first braking member 21a may be coupled to the brake housing 9 using splines to allow axial movement of the first braking member 21a in relation to the brake housing 9. Although not shown in FIG. 2, it should be noted that the brake assembly 7 may additionally comprise at least a third braking member that is axially movable by a parking brake actuator to exert an axial force on the first braking member 21a, to thereby press the friction members 19 between the first 21a and second 21b braking members when the parking brake is operated.

As is also indicated in FIG. 2, the wear indicator assembly 23 comprises an indicator rod 27 passing through the brake housing 9. The indicator rod 27 has a first end 29 inside the brake housing at a first distance d1 from the rotational axis 17, and a second end 31 visible from the outside of the brake housing 9. The second end 31 is at a second distance d2, greater than the first distance d1, from the rotational axis 17. The indicator rod 27 is slidable to allow the first end 29 of the indicator rod 27 to abut against a surface 37 inside the brake housing 9 at an abutting position that depends on a current thickness of the friction members 19.

Through the configuration of the wear indicator assembly 23 in the brake assembly 7 according to embodiments of the present invention, the wear of the friction members 19 can be assessed by observing the second end 31 of the indicator rod 27, which may protrude through the envelope portion 41 of the brake housing 9. This means that the wear of the friction members 19 can be inspected even when there is no access to one or both of the end portions of the brake housing 9. In practice, a first reading of the position of the second end 31 of the indicator rod 27, in relation to the brake housing 9, may be taken when new friction members 19 have been installed. Subsequent readings of the position of the second end 31 of the indicator rod 27 may be taken at predefined times. The differences between the subsequent readings and the first reading indicate the wear of the friction members 19. The readings should be taken when the brake is operated and the second end 31 of the indicator rod 27 pushed in as far as possible, so that the first end 25 of the indicator rod 27 abuts against the first braking member 21a, or another part of the braking assembly that follows movement of the first braking member 21a. The readings may, for example, be taken using a vernier caliper or any other suitable instrument.

Examples of different wear indicator assembly configurations will be described below with reference to FIGS. 3A-C.

Figure 3A:
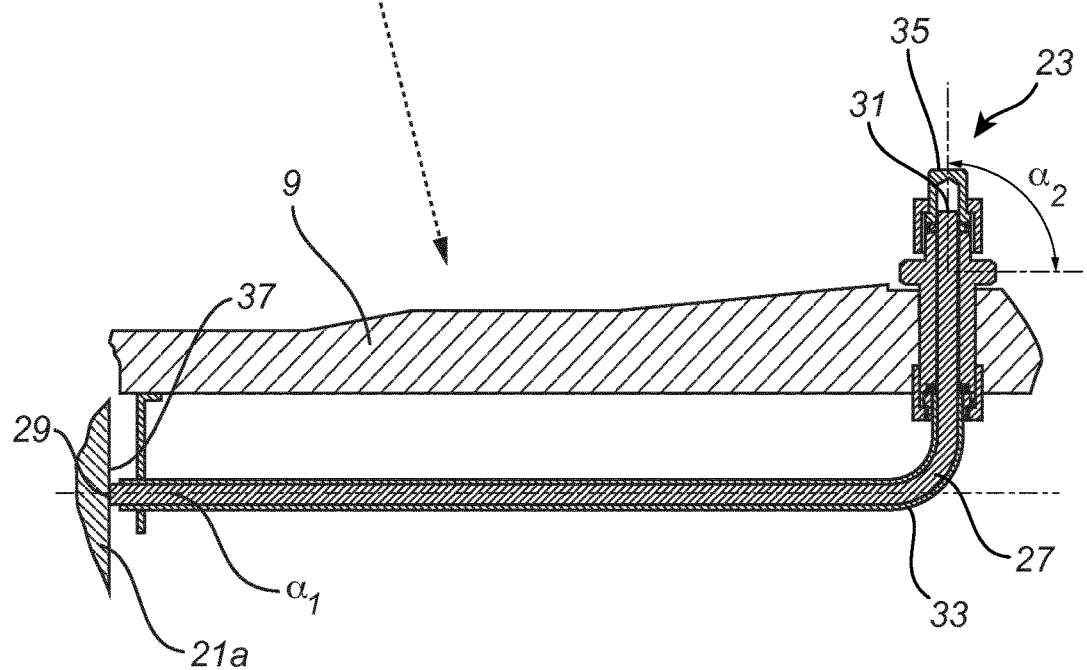
FIGS. 3A-C schematically illustrate different configurations of the wear indicator assembly comprised in the brake assembly in FIG. 2.

Referring first to FIG. 3A, a first example configuration of the wear indicator assembly 23 will be described.

As can be seen in FIG. 3A, the wear indicator assembly 23 further comprises a bent tubular guide 33 accommodating the indicator rod 27. Furthermore, the indicator rod 27 is arranged to form a first angle $\alpha 1$ in respect of a line parallel to the rotational axis 17 at the first end 29 of the indicator rod 27, and a second angle $\alpha 2$ in respect of a line parallel to the rotational axis 17 at the second end 31. As is schematically indicated in FIG. 3A, the second angle $\alpha 2$ is greater than the first angle $\alpha 1$, and the difference between the first $\alpha 1$ and second $\alpha 2$ angles is around 90°.

In the example configuration of FIG. 3A, the indicator rod 27 is at least partly flexible, allowing the indicator rod 27 to slide inside the rather sharply bent tubular guide 33. The indicator rod 27 may suitably comprise a spiral spring segment, or the entire indicator rod 27 may be formed by a spiral spring.

At the first end 29 thereof, the indicator rod 27 directly abuts against an axially directed surface 37 of the first braking member 21a. The second end 31 protrudes through the brake housing 9, and is provided with a plug 35, which may be used to calibrate the wear indicator assembly 23.

Figure 3B:
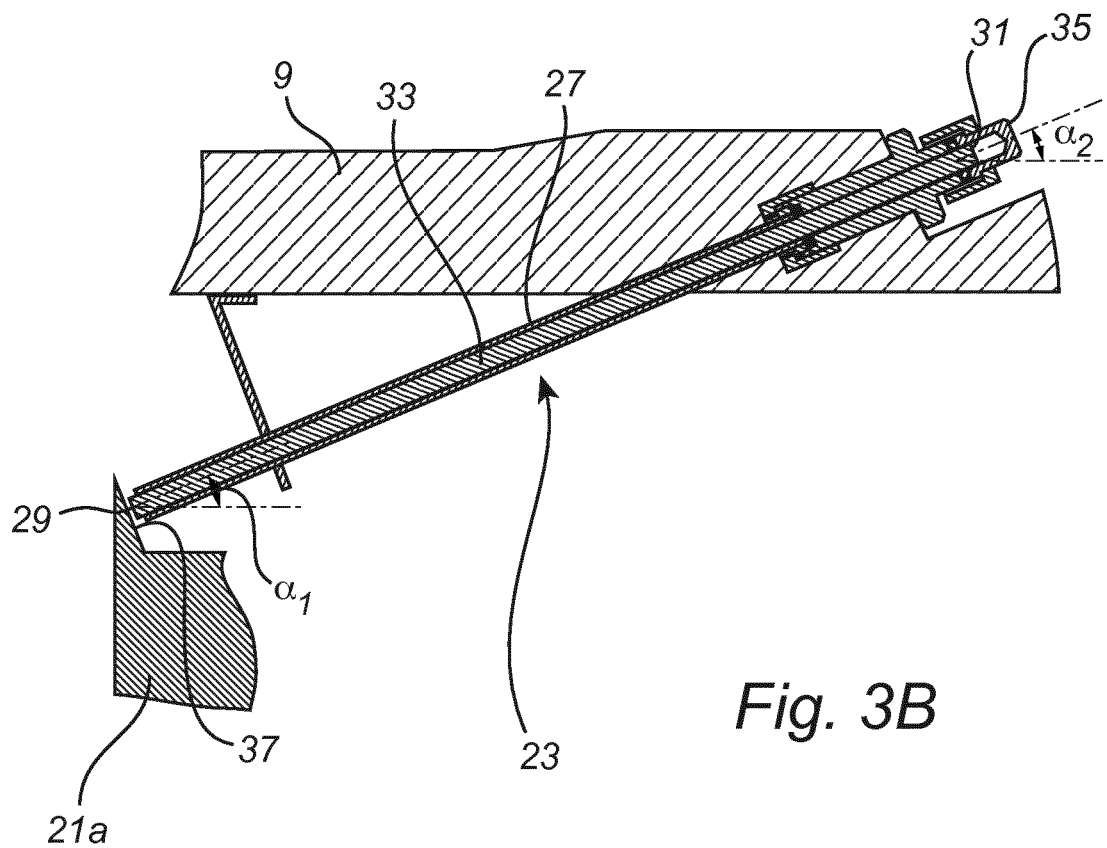

FIG. 3B schematically shows a second example configuration of the wear indicator assembly 23, which mainly differs from the first example configuration in FIG. 3A in that the indicator rod 27 is a straight rigid rod, and that the abutment surface 37 of the first braking member 21a is angled in relation to a plane perpendicular to the rotational axis 17. In this example configuration, the first angle $\alpha 1$ at the first end 29 of the indicator rod 27 is substantially the same as the second angle $\alpha 2$ at the second end 31 of the indicator rod 27.

Figure 3C:
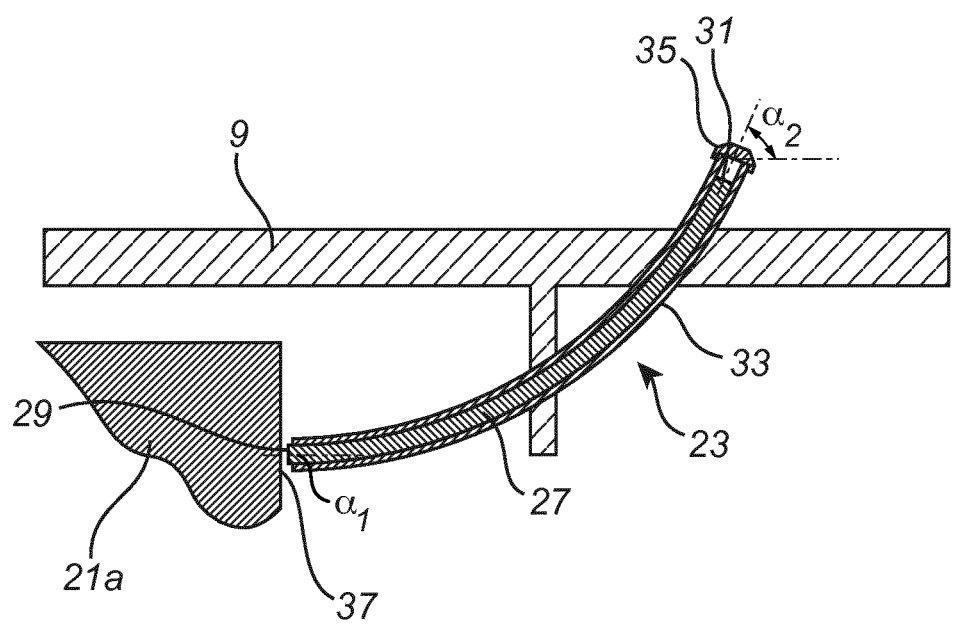

FIG. 3C schematically shows a third example configuration of the wear indicator assembly 23, which mainly differs from the first example configuration in FIG. 3A in that the indicator rod 27 is a curved rigid rod. In this example configuration, the first angle $\alpha 1$ at the first end 29 of the indicator rod 27 is smaller than the second angle $\alpha 2$ at the second end 31 of the indicator rod 27.

It is to be understood that the present invention is not limited to the embodiments described above and illustrated in the drawings; rather, the skilled person will recognize that many changes and modifications may be made within the scope of the appended claims.

The invention claimed is:

1. A brake assembly for a working machine having at least one wheel, the brake assembly comprising:
    a brake housing filled with fluid;
    a wheel rotor having a first portion to be coupled to said wheel, and a second portion arranged inside said brake housing, said wheel rotor being rotatable around a rotational axis in relation to said brake housing;
    at least one friction member coupled to the second portion of said wheel rotor to rotate inside said brake housing when said wheel rotor rotates around said rotational axis;
    a first braking member and a second braking member arranged to sandwich said at least one friction member between said first braking member and said second braking member, at least said first braking member being movable in a direction parallel to said rotational axis to press said at least one friction member between said first and second braking members; and
    a wear indicator assembly for indicating wear of said at least one friction member at an indication position on an outside of said brake housing, wherein said wear indicator assembly comprises an indicator rod passing through said brake housing, said indicator rod having a first end inside said brake housing at a first distance from said rotational axis and a second end protruding from the brake housing to be visible from the outside of said brake housing, wherein said indicator rod is slidable to allow the first end of said indicator rod to abut against a surface inside said brake housing at an abutting position that depends on a current thickness of said at least one friction member,
    wherein the second end of said indicator rod is arranged outside the housing at a second distance from said rotational axis, greater than said first distance of the first end,
    wherein said wear indicator assembly further comprises a rigid bent tubular guide arranged inside the brake housing and bent inside the brake housing, the bent tubular guide accommodating said indicator rod, said indicator rod comprising a flexible portion and being arranged to form a first angle in respect of a line parallel to said rotational axis at the first end of said indicator rod, and form a second angle in respect of a line parallel to said rotational axis at the second end of said indicator rod, said second angle being greater than said first angle, and
    wherein the second end of the indicator rod protrudes from the brake housing with the second angle.

2. The brake assembly according to claim 1, wherein said indicator rod comprises an adjustable end piece at the second end of said indicator rod.

3. The brake assembly according to claim 1, wherein the first end of said indicator rod is in direct abutment with said first braking member.

4. A vehicle comprising the brake assembly claim 1.

5. The brake assembly according to claim 1, wherein a difference between said second angle and said first angle is at least 45°.

6. The brake assembly according to claim 3, wherein the difference between said second angle and said first angle is at least 60°.

7. The brake assembly according to claim 1, wherein said brake housing comprises a first end portion; a second end portion; and an envelope portion connecting said first end portion and said second end portion.

8. The brake assembly according to claim 7, wherein the second end of said indicator rod extends through said brake housing in the envelope portion of said brake housing.

* * * * *